Patented June 17, 1941

2,245,719

UNITED STATES PATENT OFFICE 2,245,719

CONCENTRATION OF OLEFINS

Richard F. Robey, Roselle, N. J., assignor to Standard Oil Development Company, a corporation of Delaware No Drawing. Application December 30, 1938, Serial No. 248,471

15 Claims. (Cl. 260—677)

This invention relates to the separation and concentration of olefins from gaseous mixtures containing olefins and saturated hydrocarbon gases and other gases, and relates particularly to the separation and concentration of ethylene and propylene from gaseous mixtures of unsaturated and saturated hydrocarbons.

Hydrochloric acid and ammoniacal solutions of cuprous chloride are known to have a preferential solvent action for ethylene, propylene, butylene, and butadiene and may be used to separate these olefins from mixtures of olefins and saturated hydrocarbons. Cuprous solutions that are prepared by the use of one or more of the bases of the hydroxy-alkylamine group in place of ammonia have also been used to separate olefins from mixtures of olefins and saturated hydrocarbons. Cuprous salts with the certain amides have likewise been used. The solvent actions of these various solvent mixtures are limited, as high pressures with low temperatures are required to separate substantial amounts of olefins.

An object of this invention is to use a cuprous salt solution wherein the amounts of olefins that are separated are substantially increased without the use of very high pressures.

According to this invention the lower olefins, ethylene, propylene and the butylenes, are absorbed from gaseous mixtures containing the olefins and saturated hydrocarbons by contacting the gaseous mixture with cool solutions of cuprous salts and liquid organic nitrogen compounds. The olefins are selectively absorbed by aqueous solutions of cuprous salt and organic nitrogen compounds, such as pyridine, piperidine, formamide and acetamide, and may be recovered upon heating and/or reducing the pressure over the solution. The organic nitrogen compound that is used with the cuprous salt in preparing the absorbent solution is preferably pyridine. Although the other organic nitrogen compounds may be used, the amounts of the olefin absorbed are much larger when pyridine is used. Pyridine solutions of cuprous salts for olefin concentration also possess a definite advantage over ammoniacal solutions, since pyridine solutions do not contaminate the concentrated olefin with vapors as do ammonia solutions. A solution that may be used according to this invention is prepared with the following composition: 4 mols of pyridine with 2 mols of acetic acid per liter and saturated with cuprous oxide, so that at 25° C. this solution contains about 1.92 molars of cuprous copper. It is not intended to limit this process to the use of this particular complex of pyridine, acetic acid and cuprous oxide as other cuprous compounds may also be used. One particular advantage in the use of this solution is its being non-corrosive.

At atmospheric pressure, the following volumes of olefin gases are dissolved per unit volume of the above solution containing the complex of pyridine, acetic acid and cuprous oxide:

Table 1

| Temp., °C. | $C_2H_4$ | $C_3H_6$ |
|---|---|---|
| 30 | 12.0 | 4.0 |
| 20 | 17.5 | 6.0 |
| 10 | 22.5 | 9.3 |
| 0 | 29.0 | 12.8 |

The gas is measured at 25° C. 760 mm. pressure. When the pressure is increased, larger amounts of the olefin gases are then absorbed. The solubility of the saturated hydrocarbons and hydrogen is low in this absorbent solution for ethylene and propylene. A substantially pure ethylene gas can be obtained from the olefin saturated absorption solution by partially releasing the pressure or slightly heating to first evolve the propylene with a small amount of ethylene, after which an ethylene-rich gas can be obtained on further heating or lowering of pressure. If desired, propylene may be removed from the original gas by a prior scrubbing with sulfuric acid, gas oil, or a polymerizing agent, after which pure ethylene may be obtained by the use of this absorbent. Acetylene, if the content is over 0.1%, is generally first removed from the olefin-containing gas either by an absorption process using an olefin-saturated cuprous solution, or by selective hydrogenation of the acetylene.

Where cuprous chloride solutions with pyridine and an excess of an acidic compound are used, the following table illustrates the solubility of the olefin at the various temperatures and at atmospheric pressure. The solubility is expressed in volumes of gas per unit volume of solution.

Table 2

| Temp., °C. | $C_2H_4$ | $C_3H_6$ |
|---|---|---|
| 25 | 2.25 | 0.75 |
| 20 | 4.25 | 1.25 |
| 10 | 5.75 | 1.75 |

The aqueous solution used contained 3 mols of pyridine, 6 mols of hydrochloric acid per liter and saturated with cuprous chloride. The olefin may be recovered from the solution and the solution regenerated for further absorption by heating and/or reducing the pressure. This particular solution has a distinct advantage in that it is not affected by acetylene when the latter occurs in concentrations of 0.1% or less. Basic solutions of cuprous salts form an explosive red cuprous acetylide in the presence of acetylene which constitutes an inherent hazard to the process. Acetylene concentrations greater than 0.1% with the acid solutions result in the presence of this gas in the concentrated olefin.

Where certain organic solvents are used to separate olefins by scrubbing gaseous mixtures, the selectivity of these solvents for the olefins may be improved considerably by the use of certain organic nitrogen compounds, such as the higher aliphatic and aromatic amines, together with cuprous chloride to the extent of the saturation of the solution. For example, in the following table is given a comparison of the solubility of ethylene in the isopropyl alcohol alone and isopropyl alcohol containing butylamine and cuprous chloride. The solubility is expressed in volumes of olefin gas per unit volume of solution.

*Table 3*

| Temp., °C. | Solubility at atmospheric pressure | |
|---|---|---|
| | IsoPrOH | IsoPrOH+ Bu$_2$(NH)+CuCl |
| 30 | 1.0 | 2.25 |
| 20 | 1.5 | 3.0 |
| 10 | 2.5 | 3.5 |
| 0 | 3.5 | 5.5 |

The solution of cuprous salts and pyridine may be used in the storage of olefins in a high state of purity. Owing to the solubility of the olefins in the cuprous solution, there is no requirement of high pressure vessels and therefore the use of the heavy walled containers that were heretofore required is dispensed with.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. A process for the recovery of olefins from gaseous mixtures containing saturated and unsaturated hydrocarbons, which comprises contacting a mixture of normally gaseous saturated and unsaturated hydrocarbons with a pyridine solution of a cuprous salt at a temperature of 0° to 30° C., separating a saturated solution and expelling unsaturated hydrocarbons therefrom.

2. A process for the recovery of ethylene and propylene from gaseous mixtures containing ethylene and propylene, which comprises contacting a mixture of saturated and unsaturated hydrocarbons containing ethylene and propylene with a solution of pyridine, acetic acid and cuprous oxide at a temperature of 0° to 30° C., separating the solution and expelling ethylene and propylene therefrom.

3. A process for the recovery of ethylene and propylene from gaseous mixtures of saturated and unsaturated hydrocarbons, which comprises contacting a mixture of saturated and unsaturated hydrocarbons containing ethylene and propylene with an aqueous solution of 4 mols of pyridine per liter, 2 mols of acetic acid per liter and saturated with cuprous oxide at a temperature of 0° to 30° C., separating the solution and expelling ethylene and propylene therefrom.

4. A process for the recovery of ethylene and propylene from gaseous mixtures of saturated and unsaturated hydrocarbons, which comprises contacting a mixture of saturated and unsaturated hydrocarbons containing acetylene, ethylene and propylene with an olefin saturated solution of a hydrochloric acid, ammonium chloride and cuprous chloride, at a temperature of 0° to 30° C., separating the gases therefrom and contacting with a solution of pyridine, acetic acid and cuprous oxide, separating the solution and expelling ethylene and propylene therefrom by the application of heat.

5. A process for the recovery of ethylene and propylene from gaseous mixtures of saturated and unsaturated hydrocarbons, which comprises contacting a mixture of saturated and unsaturated hydrocarbons containing acetylene, ethylene and propylene with an olefin saturated solution of a hydrochloric acid, ammonium chloride and cuprous chloride at a temperature of 0° to 30° C., separating the gases therefrom and contacting with a solution of pyridine, acetic acid and cuprous oxide, separating the solution and expelling ethylene and propylene by lowering the pressure.

6. A process for the separation and recovery of ethylene and propylene from a gaseous mixture, which comprises contacting a mixture of saturated and unsaturated hydrocarbons containing ethylene and propylene with a solution of pyridine, acetic acid and cuprous oxide at a temperature of 0° to 30° C., separating the solution therefrom, heating to expel substantially all the propylene and then heating further to expel ethylene.

7. A process for the recovery of ethylene and propylene from gaseous mixtures, which comprises contacting a mixture of saturated and unsaturated hydrocarbons containing ethylene and propylene with a solution of pyridine and cuprous chloride at a temperature of 0° to 30° C., separating a saturated solution of the pyridine and cuprous chloride and expelling ethylene and propylene by the application of heat.

8. A process for the recovery of ethylene and propylene from gaseous mixtures, which comprises contacting a mixture of saturated and unsaturated hydrocarbons with a solution of pyridine, acetic acid and cuprous oxide maintained at a temperature between 0° to 30° C., separating the saturated solution and expelling ethylene and propylene by the application of heat.

9. A process for the storage of ethylene and propylene which comprises contacting ethylene and propylene with a solution of pyridine, acetic acid and cuprous oxide at a temperature 0° to 30° C. and retaining the olefin dissolved therein.

10. A process for the storage of ethylene and propylene which comprises dissolving the ethylene and propylene in a solution of pyridine and cuprous chloride at a temperature of 0° to 30° C. and retaining ethylene and propylene therein.

11. A process for the storage of olefins having from 2 to 3 carbon atoms which comprises dissolving olefins having 2 to 3 carbon atoms in a solution of pyridine, acetic acid and cuprous oxide maintained at a temperature between 0° and 30° C. and retaining the olefins therein.

12. A process for the storage of ethylene which comprises dissolving the ethylene in a solution of pyridine and cuprous chloride at a temperature of 0° to 30° C.

13. A process for the storage of propylene which comprises dissolving propylene in a solution of pyridine and cuprous chloride at a temperature of 0° to 30° C.

14. A process for the recovery of ethylene and propylene from gaseous mixtures of ethylene and propylene and saturated hydrocarbons, which comprises contacting a mixture of ethylene and propylene and saturated hydrocarbons with a solution of a liquid organic nitrogen compound selected from the group consisting of pyridine, piperidine, formamide and acetamide and a cuprous compound at a temperature of 0° to 30° C., separating the solution and expelling ethylene and propylene therefrom.

15. A process for the recovery of ethylene and propylene from gaseous mixtures of saturated and unsaturated hydrocarbons, which comprises contacting a mixture of saturated and unsaturated hydrocarbons containing ethylene and propylene with a solution of a liquid organic nitrogen compound selected from the group consisting of pyridine, piperidine, formamide and acetamide, acetic acid and cuprous oxide at a temperature of 0° to 30° C., separating the solution and expelling ethylene and propylene therefrom.

RICHARD F. ROBEY.